(12) United States Patent
Sari

(10) Patent No.: US 12,476,694 B2
(45) Date of Patent: Nov. 18, 2025

(54) METHOD AND SYSTEM FOR TRANSMISSION OF AUXILIARY DATA USING RECONFIGURABLE INTELLIGENT SURFACES

(71) Applicant: Sequans Communications SA, Colombes (FR)

(72) Inventor: Hikmet Sari, Colombes (FR)

(73) Assignee: Sequans Communications SA, Colombes (FR)

( * ) Notice: Subject to any disclaimer, the term of this patent is extended or adjusted under 35 U.S.C. 154(b) by 450 days.

(21) Appl. No.: 17/875,181

(22) Filed: Jul. 27, 2022

(65) Prior Publication Data

US 2024/0039615 A1 Feb. 1, 2024

(51) Int. Cl.
| H04B 7/14 | (2006.01) |
| H04B 7/155 | (2006.01) |
| H04L 27/00 | (2006.01) |
| H04L 27/04 | (2006.01) |
| H04L 27/06 | (2006.01) |
| H04L 27/20 | (2006.01) |

(52) U.S. Cl.
CPC ..... H04B 7/15507 (2013.01); H04L 27/0014 (2013.01); H04L 27/04 (2013.01); H04L 27/06 (2013.01); H04L 27/20 (2013.01); *H04L 2027/0057* (2013.01)

(58) Field of Classification Search
CPC . H04B 7/15507; H04L 27/0014; H04L 27/04; H04L 27/06; H04L 27/20; H04L 2027/0057; H04L 27/3488
USPC ....................................................... 370/315
See application file for complete search history.

(56) References Cited

U.S. PATENT DOCUMENTS

| 11,389,230 B2* | 7/2022 | Panescu ............... A61B 5/0538 |
| 11,823,737 B2* | 11/2023 | Sforzin ............. G11C 13/0038 |
| 2022/0052764 A1* | 2/2022 | Medra ................. H04B 10/614 |
| 2022/0278738 A1* | 9/2022 | Dai ...................... H04B 7/0695 |
| 2022/0416869 A1* | 12/2022 | Dai ........................ H04B 7/026 |
| 2023/0135359 A1* | 5/2023 | Taherzadeh Boroujeni ............... H04W 24/08 370/252 |
| 2023/0396299 A1* | 12/2023 | Yang ..................... H04L 5/0016 |
| 2023/0421209 A1* | 12/2023 | Jiang ..................... H04W 24/02 |

(Continued)

OTHER PUBLICATIONS

Chen, X., et al., "Analysis and Compensation of Spatial Correlation in Data Transmission Using RIS", IEEE Global Communications Conference (GLOBECOM), 2021, 6 pages.

(Continued)

*Primary Examiner* — Chuong T Ho
(74) *Attorney, Agent, or Firm* — ONE LLP

(57) ABSTRACT

Some embodiments relate to systems and methods for communication of electronic signals. An example method includes receiving a first signal having a predetermined modulation. The example method includes generating a transmission for a second signal by superimposing the second signal on the modulation of the first signal by adjusting at least one of two phase states or two amplitude states of the modulation using a Reconfigurable Intelligent Surface (RIS). The example method also includes transmitting the second signal using hierarchical modulation, the predetermined modulation and the superimposed second signal on the predetermined modulation, wherein the first signal is transmitted at a higher data rate than the second signal.

20 Claims, 5 Drawing Sheets

(56) References Cited

U.S. PATENT DOCUMENTS

2024/0089939 A1* 3/2024 Yang .................. H04W 72/541
2025/0047328 A1* 2/2025 Medra ................. H04B 17/346
2025/0047365 A1* 2/2025 Echigo ............... H04B 7/15542

OTHER PUBLICATIONS

Di Renzo, M., et al., "Smart Radio Environments Empowered by Reconfigurable Intelligent Surfaces: How It Works, State of Research, and Road Ahead", IEEE Journal on Selected Areas in Communications, 2020, vol. 38, No. 11, pp. 2450-2525.

Hussein, Y., et al., "Reconfigurable Intelligent Surface Index Modulation with Signature Constellations", IEEE Wireless Communications and Networking Conference (WCNC), 2021, 7 pages.

Liaskos, C., et al., "A New Wireless Communication Paradigm Through Software-Controlled Metasurfaces," IEEE Communications Magazine, 2018, vol. 56, No. 9, pp. 162-169.

Wu, Q., et al., "Towards Smart and Reconfigurable Environment: Intelligent Reflecting Surface Aided Wireless Network," IEEE Communications Magazine, 2020, vol. 58, No. 1, pp. 106-112.

* cited by examiner (a) Tile *T1* is active (b) Tile *T2* is active (c) Tile *T3* is active (d) Tile *T4* is active

METHOD AND SYSTEM FOR TRANSMISSION OF AUXILIARY DATA USING RECONFIGURABLE INTELLIGENT SURFACES

TECHNICAL FIELD

The disclosure relates generally to the field of wireless communications, specifically and not by way of limitation, some embodiments are related to the transmission of data using reconfigurable intelligent surfaces.

BACKGROUND OF THE INVENTION

Reconfigurable Intelligent Surfaces (RIS) are currently receiving significant attention as a new technology to boost performance in future generations of wireless communications systems. In addition to boosting performance of user data, the RIS arrays may also be used to transmit auxiliary data to the base station. The transmission of auxiliary data, assuming that the auxiliary data is transmitted at the user symbol rate and partitioning the RIS array into tiles and assigning the auxiliary data bits may activate the tile patterns. This technique is sensitive to spatial correlation between RIS elements, which may be very high due to the small size and the proximity of these elements. From a signal-to-noise (SNR) standpoint, it may be desirable to avoid the splitting of the RIS array into tiles and to transmit the auxiliary data while simultaneously activating all RIS elements. Transmitting the auxiliary data while simultaneously activating all RIS elements may be done by introducing a common phase shift and/or attenuation in the RIS elements and mapping the auxiliary data bits to the set of these parameters. Inevitably, the transmission of additional data by the RIS array may degrade the user data performance. Accordingly, it may be advantageous to transmit data in a way that does not degrade the user data performance.

SUMMARY OF THE INVENTION

Some embodiments relate to systems and methods for communication of electronic signals. An example method includes receiving a first signal having a predetermined modulation. The example method includes generating a transmission for a second signal by superimposing the second signal on the modulation of the first signal by adjusting at least one of two phase states or two amplitude states of the modulation using a Reconfigurable Intelligent Surface (RIS). The example method also includes transmitting the second signal using the predetermined modulation and the superimposed second signal on the predetermined modulation.

An example communication system includes a memory and a processor. The processor is coupled to the memory and includes instructions that, when executed by the processor, cause the processor to be able to receive a first signal having a predetermined modulation. Additionally, when executed by the processor, the instructions cause the processor to generate a transmission for a second signal by superimposing the second signal on the modulation of the first signal by adjusting at least one of two phase states or two amplitude states of the modulation using a Reconfigurable Intelligent Surface (RIS). When executed by the processor, the instructions also cause the processor to transmit the second signal using hierarchical modulation, the predetermined modulation and the superimposed second signal on the predetermined modulation. Additionally, when executed by the processor, the instructions cause the processor to the first signal to be transmitted at a higher data rate than the second signal.

An example non-transitory computer-readable medium stores computer-executable code for a communication system. The code is executable to cause the communication system to be able to receive a first signal having a predetermined modulation. Additionally, the code is executable to cause the communication system to generate a transmission for a second signal by superimposing the second signal on the modulation of the first signal by adjusting at least one of two phase states or two amplitude states of the modulation using a Reconfigurable Intelligent Surface (RIS). The code is executable to also cause the communication system to transmit the second signal using hierarchical modulation, the predetermined modulation and the superimposed second signal on the predetermined modulation. The first signal is transmitted at a higher data rate than the second signal.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

Figure 1:
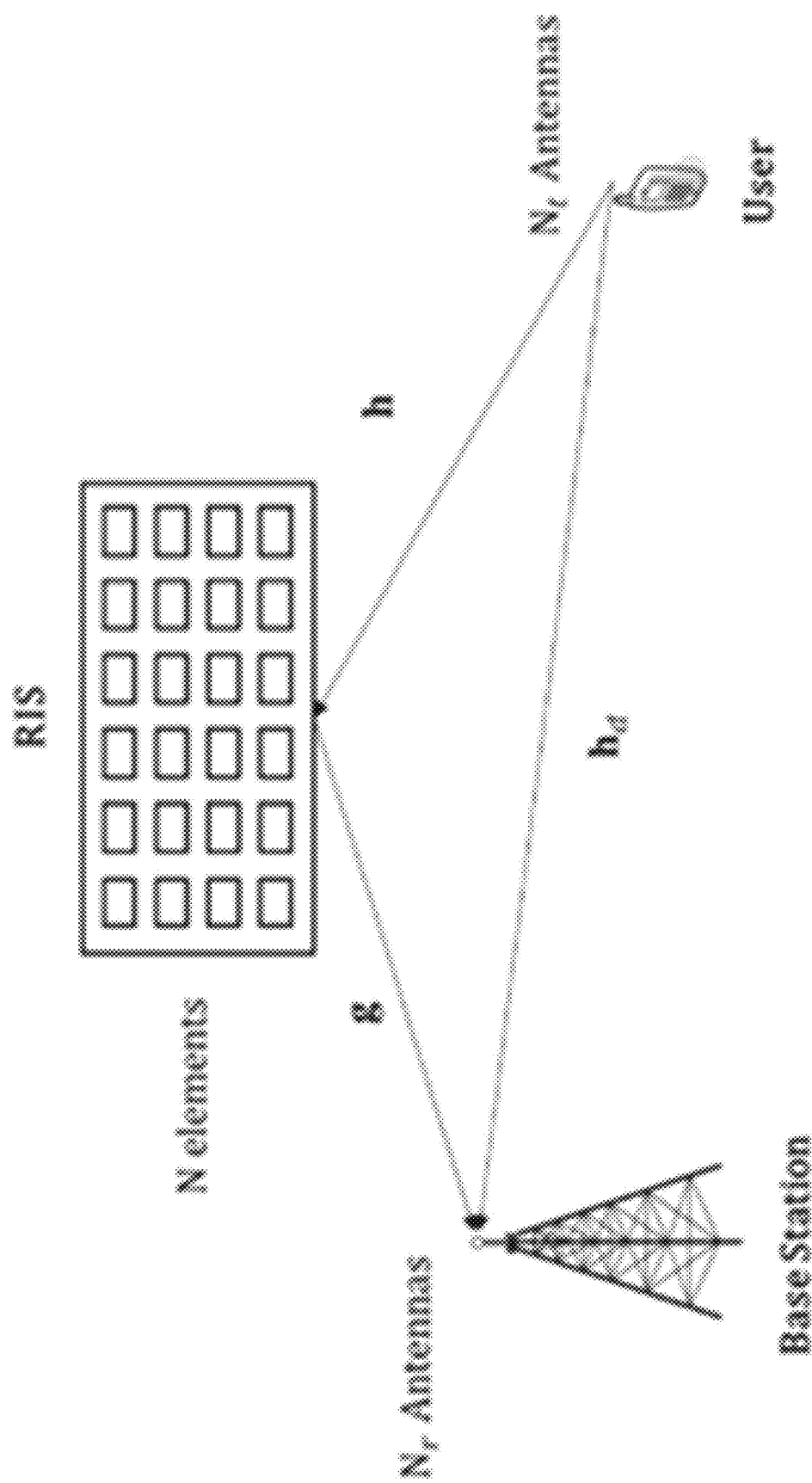
FIG. 1 is a diagram illustrating a cellular uplink using Reconfigurable Intelligent Surfaces (RIS) in accordance with the systems and methods described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of transmission of data using reconfigurable intelligent surfaces will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The degradation of user data performance discussed in the background above may be reduced as desired by resorting to a concept known as hierarchical transmission. Hierarchical transmission implies that the minimum distance in the constellation plane is smaller for the auxiliary data bits than for the user symbols, but another aspect of some embodiments may be that auxiliary local data has a much lower bit rate than the user symbol rate. Having a much lower bit rate than the user symbol rate may be exploited to improve performance in some embodiments.

A. Basics of RIS

Successive generations of wireless communications networks may use different types of single-carrier and multi-carrier transmission methods as well as single-antenna and multiple-input multiple-output (MIMO) techniques, but all of these technologies considered the wireless channel of fixed nature and non-modifiable. Consequently, the channel peculiarities might only be circumvented through the design of complex transmission and reception schemes. Reconfigurable Intelligent Surfaces (RIS) have been introduced to improve performance by manipulating the wireless channel itself. Reconfigurable Intelligent Surfaces may include an array of controllable elements which may act as a relay on the incoming signal.

FIG. 1 is a diagram illustrating a cellular uplink using RIS in accordance with the systems and methods described herein. In the illustrated example of FIG. 1, a transmitted signal may be generated by the User, e.g., using a mobile telephone handset, or some other electronic communication device. The transmitted signal may be intended for the base station. The signal may follow, for example, two paths to the base station. The first path may be the direct path $h_d$. The second path may be one that goes through the RIS array, e.g., the path h and the path g (together). An embodiment of the systems and methods described herein may transmit an auxiliary data signal by further modulating the user signal when it is reflected toward the base station by the RIS elements. The RIS elements may introduce a phase shift, an attenuation, or both a phase shift and an attenuation in the incident signal. An object of some embodiments may be to transmit the auxiliary data signal jointly with the user signal: (a) without significantly degrading the performance of the user signal, and (b) ensuring also a good performance for the auxiliary data signal, exploiting the property that this signal has a lower data rate than the user signal, and using the receivers described herein. In an example embodiment, the lower rate of the auxiliary data signal may be transmitted by further modulating the user signal by means of the phase shifts and attenuations introduced by the RIS array elements.

To describe the basic principle, an example uplink in a cellular system from a user to the base station may be aided by an array of RIS elements as illustrated in FIG. 1. The RIS in FIG. 1 may be a rectangular array with N elements. Assuming that both the base station and the user have a single antenna (N_t=1, N_r=1), the samples of the signal received by the base station may be of the form:

$$r = \left(h_d + \sum_{n=1}^{N} g_n . a_n e^{j\varphi_n} . h_n\right) x + w \qquad (1)$$

where x is the symbol transmitted by the user, w is the additive white Gaussian noise (AWGN), $h_d$ may be the direct path coefficient, $h_n$ may be the channel coefficient from the user to the nth element of the RIS array, and $g_n$ may be the channel coefficient from the nth element of the RIS array to the base station. It may be assumed here that the RIS elements are basically passive and operate in an ON/OFF mode. When the nth element is in the OFF mode, the amplitude parameter $a_n$ in eqn. (1) may take on the value of "0," and when the RIS element is in the ON mode $a_n$ may take on the value of "1." In the ON mode, the RIS elements may also involve a phase shift, denoted $\varphi_n$ for the nth element. The time index is omitted in all signals and functions in eqn. (1).

The RIS array may typically be placed in line-of-sight (LOS) with the base station, while there may be obstacles and shadowing between the user and the RIS. Under this hypothesis, the channel between the user and the RIS array may be modeled as a Rayleigh fading channel, and the channel between the RIS array and the base station may be modeled as a Rician channel, which includes both LOS and specular components. Also, the direct path from the user to the base station may be modeled as a Rayleigh fading channel. It may be assumed that the statistical distribution of the channels corresponding to different RIS elements are identical, e.g., the statistical distributions of $h_n$ and $g_n$ may be independent of index n.

In a case with the RIS array used purely to enhance the SNR, the RIS elements may all be in the ON mode and the array does not transmit any additional information with respect to what is transmitted by the user. Assuming $a_n=1$ and $\varphi_n=0$ for all n in eqn. (1), the receive SNR is:

$$SNR = \frac{E\left(\left|h_d + \sum_{n=1}^{N} h_n g_n\right|^2\right)\sigma_x^2}{\sigma_w^2} \quad (2)$$

where E(.) denotes statistical averaging, and where $\sigma_x^2 = E(|x|^2)$, and $\sigma_w^2 = E(|w|^2)$. When the channel coefficients are all uncorrelated, eqn. (2) simplifies to:

$$SNR = (\sigma_{h_d}^2 + N\sigma_h^2\sigma_g^2)\sigma_x^2/\sigma_w^2 \quad (3)$$

where $\sigma_{h_d}^2 = E(|h_d|^2)$, $\sigma_h^2 = E(|h_n|^2)$, $\sigma_g^2 = E(|g_n|^2)$ are the variances of the channel responses $h_d$, $h_n$ and $g_n$, respectively. Note that in the absence of RIS, eqn. (1) becomes $r = h_d x + w$ and the corresponding receive SNR is $SNR' = \sigma_{h_d}^2 \sigma_x^2/\sigma_w^2$. Therefore, the SNR improvement provided by the RIS array is:

$$\frac{SNR}{SNR'} = \frac{\sigma_{h_d}^2 + N\sigma_h^2\sigma_g^2}{\sigma_{h_d}^2} \quad (4)$$

For large RIS arrays, the second term in the numerator of this equation dominates and the SNR increases linearly with the number of elements N. Using such arrays, the cell coverage can be drastically improved.

B. Transmission of Auxiliary Data

The RIS arrays have been considered to transmit local auxiliary data in addition to relaying the user data assuming that both streams have the same data rate. To do so, the N-element array was partitioned into K rectangular tiles of L=N/K elements each.

Figure 2:
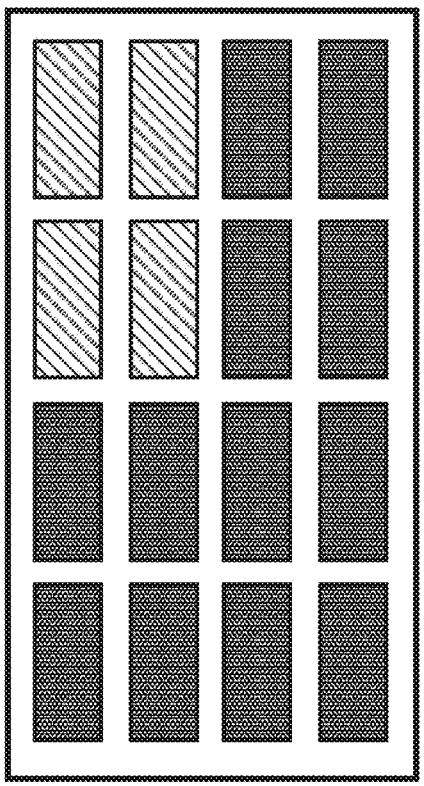
FIG. 2 is a diagram illustrating a RIS Array with 16 elements split into four tiles in accordance with the systems and methods described herein.
Figure 2:
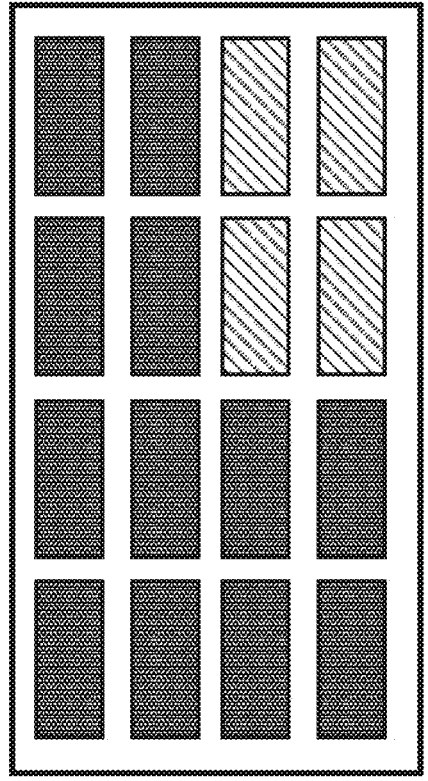
Figure 2:
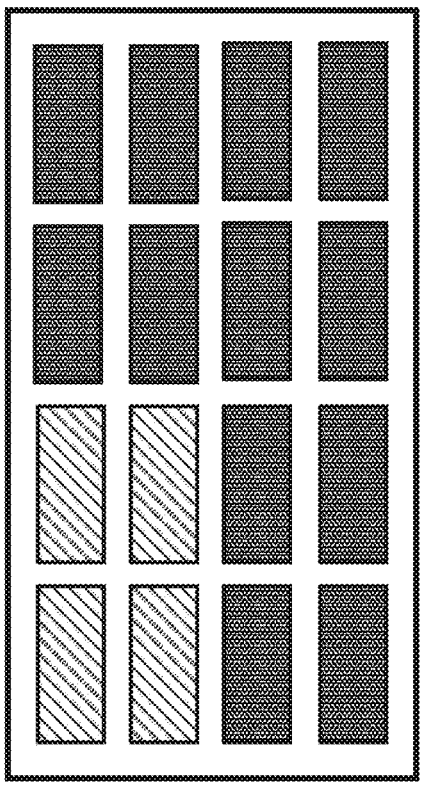
Figure 2:
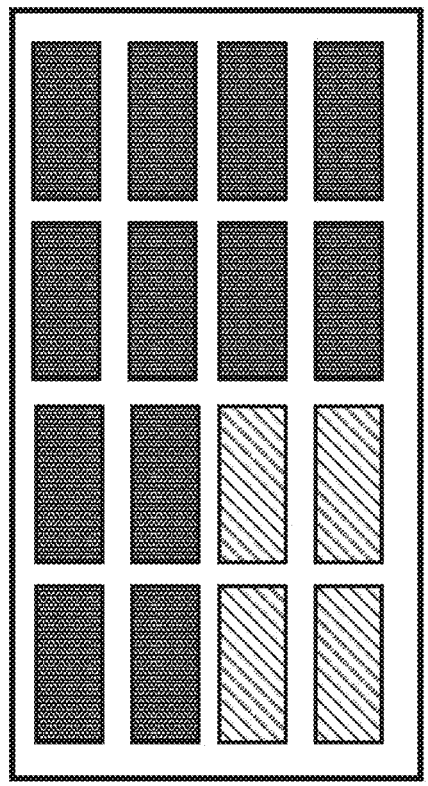

FIG. 2 is a diagram illustrating a RIS Array with 16 elements split into four tiles in accordance with the systems and methods described herein. FIG. 2 illustrates a square-shaped 16-element array split in 4 tiles. We refer to these tiles as $T_1$, $T_2$, $T_3$, $T_4$, respectively. The blocks with angled shading in FIG. 2 indicate that the corresponding RIS elements are in the ON state, and the blocks with the dotted shading in FIG. 2 indicate that the corresponding RIS elements are in the OFF state. Correspondingly, tile $T_1$ is active in FIG. 2(a), tile $T_2$ is active in FIG. 2(b), tile $T_3$ is active in FIG. 2(c), tile $T_4$ is active in FIG. 2(d).

The four tile activation states in FIG. 2 may be used to transmit two information Bits Per Channel Use (BPCU). From the SNR standpoint, instead of activating only one tile as illustrated in FIG. 2, it may be better to activate 2 or 3 tiles. With respect to activating one tile only, this increases the SNR gain for the symbols transmitted by the user. The 2-tile activation patterns may be defined as follows: $P_1=\{T_1, T_2\}$, $P_2=\{T_3, T_4\}$, $P_3=\{T_1, T_3\}$, $P_4=\{T_2, T_4\}$. Proceeding further, the 3-tile activation patterns can be defined as: $P_1=\{T_1, T_2, T_3\}$, $P_2=\{T_2, T_3, T_4\}$, $P_3=\{T_1, T_3, T_4\}$, and $P_4=\{T_1, T_2, T_4\}$. The SNR gain with respect to activating one tile only is $10\log_{10}(M)$, when the activation patterns are composed of M tiles. Therefore, the gain may be 3 dB with 2-tile activation patterns and 4.8 dB with 3-tile activation patterns. This technique of transmitting auxiliary local data may be similar to Spatial Modulation (SM) in MIMO systems, and may be referred to as RIS-SM.

The received signal in RIS-SM may be of the form:

$$r = \left(h_d + \sum_{n \in S_i} h_n g_n e^{j\varphi_n}\right)x + w \quad (5)$$

where the index n in the sum belongs to subset $S_i$ that may be composed of the indices of the RIS elements in the activation pattern $P_i$, $i \in \{1, 2, 3, 4\}$. The receiver may estimate symbol x transmitted by the user and also determine the activation pattern $P_i$, or equivalently the subset $S_i$, used during the transmission of this symbol. The optimum receiver is the maximum likelihood (ML) receiver, which computes the Euclidean distance of the received noisy signal from all possible signal values at the receiver in the absence of noise and selects the one which corresponds to the minimum distance.

The full operation of this transmission technique is described in X. Chen, H. Huang, G. Gui, and H. Sari, "Analysis and Compensation of Spatial Correlation in Data Transmission Using RIS," Proc. GLOBECOM 2021, December 2021, Madrid, Spain incorporated herein by reference, where it is also shown that this technique is very sensitive to spatial correlation of the RIS elements. That reference also describes a technique based on the introduction of phase shifts in the RIS elements to reduce sensitivity to spatial correlation. In fact, activating all RIS elements to transmit the user data leads to a better SNR and an overall bit-error-rate (BER) performance. However, transmission of auxiliary data by the RIS array inevitably degrades the BER performance of the user signal, and this degradation can be very high if the data transmitted by the RIS has the same rate and performance requirements as the users' signals. Some embodiments of the systems and methods described herein may solve this problem using the concept of hierarchical transmission. Hierarchical transmission may decouple the BER performance of the users' signals from that of the auxiliary signal transmitted by the RIS array. Specifically, in some embodiments, the RIS elements may be used in such a way as to limit the SNR degradation of the users' signal to a desired level while transmitting an auxiliary signal with a lower performance when this signal is transmitted at the same data rate. Another feature of some embodiment of the systems and methods described herein is that the auxiliary data rate may be transmitted at only a small fraction of the user symbol rate to compensate for the reduced minimum Euclidean distance in the signal constellation plane. Transmitting the auxiliary data rate at only a small fraction of the user symbol rate may be particularly attractive for RIS arrays installed in warehouses, factories, power plants, or other facilities that may be configured to transmit locally collected data from sensors, meters, and other devices within a communications system, e.g., local to the particular facility. The feature of transmitting the auxiliary data at a lower rate than the user symbol rate may make the techniques described herein simpler and more compatible with physical mechanisms needed to dynamically configure the RIS elements.

Figure 3:
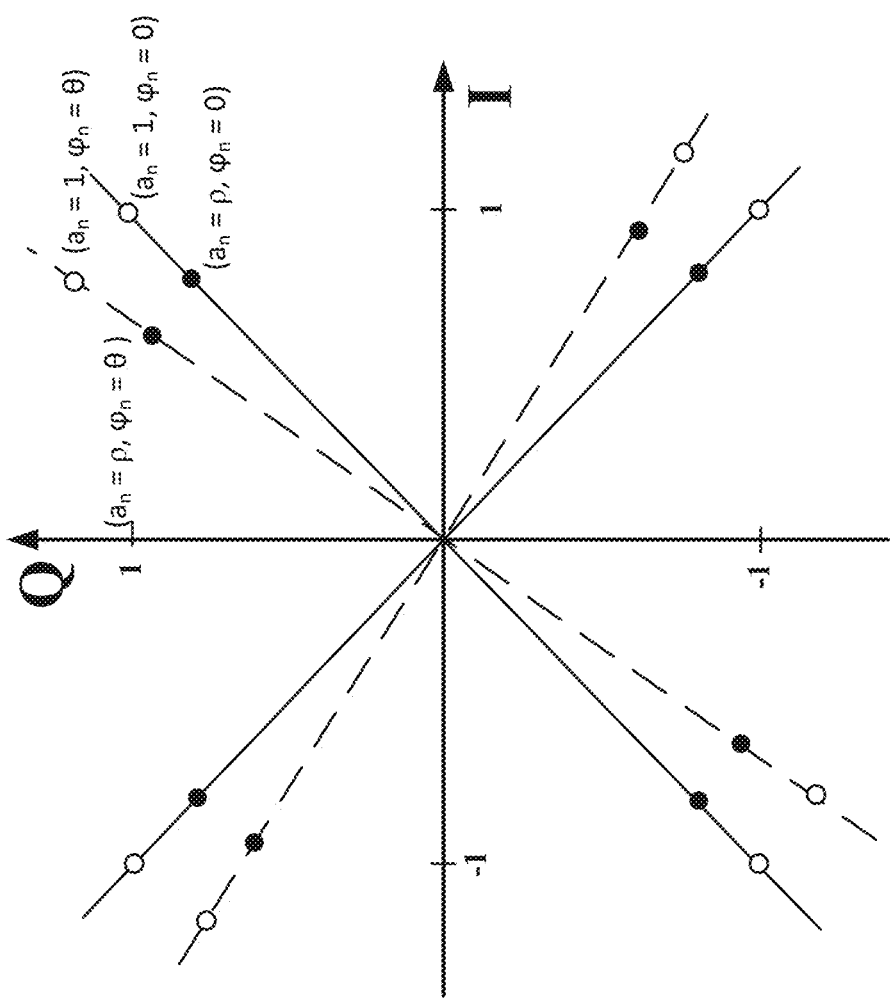
FIG. 3 is a diagram illustrating signal states corresponding to the transmission of Quaternary phase shift keying (QPSK) symbols by the users and 2 bits by the RIS array where the first and the second bits are respectively mapped onto the attenuation and phase shift parameters in accordance with the systems and methods described herein.

FIG. 3 is a diagram illustrating signal states corresponding to the transmission of Quaternary phase shift keying (QPSK) symbols by the users and 2 bits by the RIS array where the first and the second bits are respectively mapped onto the attenuation and phase shift parameters in accordance with the systems and methods described herein. For simplicity of the presentation, we will describe the embodiments of the systems and methods described herein assuming the user signal is transmitted using QPSK or 16QAM modulation, but the concept is applicable to other modulations, including higher level modulations as well.

In an example, suppose that a QPSK signal is transmitted by the user. The in-phase (I) and quadrature (Q) components of the transmitted symbol x may be of the form ±1. To transmit 1 bit of auxiliary data per channel use, the RIS elements may be configured to have two phase states or two amplitude states. In the first case, an embodiment may introduce a phase shift $\varphi_n=0$ when the bit to be transmitted is 0 and a phase shift $\varphi_n=\theta$ when the bit to be transmitted is 1. (Alternatively, an embodiment may introduce a phase shift $\varphi_n=0$ when the bit to be transmitted is 1 and a phase shift $\varphi_n=\theta$ when the bit to be transmitted is 0.) In the second case, the RIS elements do not involve any phase shift, but the RIS elements introduce an attenuation $\rho$, e.g., $a_n=\rho<1$ when the bit to be transmitted is 1 while no attenuation is introduced, e.g., $a_n=1$ when the bit to be transmitted is 0. (Alternatively, an attenuation $\rho$, e.g., $a_n=\rho<1$ when the bit to be transmitted is 0 while no attenuation is introduced, e.g., $a_n=1$ when the bit to be transmitted is 1.) It will be understood that the transmission of a 0 or 1 maybe swapped as in the alternatives described above for other example embodiments, e.g., using other modulations described herein whether those specific alternatives are called out or not. The RIS array may also transmit 2 bits per channel use by simultaneously using the phase shift and the attenuation techniques. Similarly, any groups of bits, e.g., 00, 01, 10, 11, may be transmitted using a variety of alternatives that may not be expressly called out herein.

The proposed technique is illustrated in FIG. 3 which shows 4 points in each quadrant of the signal constellation corresponding to the different combinations of the 2 bits transmitted by the RIS array. In the positive quadrant of the signal constellation in this figure, the signal point ($a_n=1$, $\varphi_n=0$) is assigned to the transmission of 00, the point ($a_n=1$, $\varphi_n=\theta$) is assigned to the transmission of 01, the point ($a_n=\rho$, $\varphi_n=\theta$) is assigned to the transmission of 11, and finally the point ($a_n=\rho$, $\varphi_n=0$) is assigned to the transmission of 10. Mapping of the auxiliary data bits in the other 3 quadrants of the constellation is deduced through rotations of $e^{j\pi/2}$, $e^{j\pi}$, $e^{3j\pi/2}$, respectively. In the positive quadrant of the signal constellation, we only have the points ($a_n=1$, $\varphi_n=0$) and ($a_n=1$, $\varphi_n=\theta$) when the RIS array transmits a single bit of auxiliary data per symbol interval using phase modulation. Similarly, we only have the points ($a_n=1$, $\varphi_n=0$) and ($a_n=\rho$, $\varphi_n=0$) when the RIS array transmits a single bit of auxiliary data per symbol interval using amplitude modulation.

Following the concept of hierarchical transmission, the phase and attenuation parameters $\theta$ and $\rho$ may be selected arbitrarily small in order to favor the performance of the user signal with respect to the auxiliary signal of the RIS array. For example, focusing on the signal attenuation technique, an attenuation parameter $\rho=0.8$ may only cause an SNR degradation of 1.9 dB for the user signal, with respect to the case without auxiliary data. This may be perfectly acceptable given the SNR improvement of several dozens of dB that can be provided by large RIS arrays. Further, using a signal attenuation parameter $\rho=0.9$ will reduce the SNR degradation for the user signal to 0.9 dB. With these values of the $\rho$ parameter, the SNR degradation of the auxiliary RIS signal will be about 14 dB in the first case and 20 dB in the second case, when the RIS signal is transmitted at the user symbol rate. But no such degradation will occur when the data rate of the auxiliary RIS signal is sufficiently low with respect to the user symbol rate. Indeed, the auxiliary data transmitted at a low bit rate appears to have a repetition code, and a 3 dB SNR gain may be achieved every time the RIS clock rate is divided by two. Therefore, division of the RIS data clock by 32 will gain 15 dB and completely recover the loss due to using an attenuation parameter $\rho=0.8$, and division of the RIS data clock by 128 may gain 21 dB and may completely recover the loss due to using $\rho=0.9$. A similar analysis holds for phase modulation. A small value of the parameter $\theta$ leads to a small SNR degradation for the user signal, but for the auxiliary bit a small value of the parameter $\theta$ may drastically reduce the minimum distance in the signal constellation plane. However, exploiting the low bit rate property of this signal according to some example embodiments, this performance loss may be completely recovered.

Let us assume that the auxiliary data is transmitted by the RIS array at a rate 1/MT with 1/T being the user symbol rate. In other words, the RIS array transmits one or two bits over an interval of M user symbols periods, and the parameter M is typically chosen so that the channel responses are quasi-static, and one channel estimation may be made over the period of MT. When the RIS array transmits a low data rate using phase modulation, the optimum receiver operates as follows:

Based on the received signal $r_m=(h_d+\Sigma_{n=1}^{N}g_n \cdot e^{j\varphi_n} \cdot h_n)x_m+w_m$ at time m, (m=1, 2, . . . , M) two decisions are made for the user symbol $x_m$, one assuming $\varphi_n=0$ for all n and using the conventional thresholds (the I and Q axes of the signal constellation), and one assuming $\varphi_n=\theta$ for all n and using thresholds rotated by an angle $\theta$. Equivalently, the second decision may be made using the conventional horizontal and vertical thresholds but after rotating the received signal by an angle $-\theta$, e.g., after multiplying it by $e^{-j\theta}$. Let us denote by $\hat{x}_m(0)$ the decision made with angle 0 and $\hat{x}_m(\theta)$ the decision made with angle $\theta$. For each one of these decisions, an error signal is derived which measures the reliability of that decision. In an example embodiment, the error signals are $e_m(0)=r_m/f-\hat{x}_m(0)$ and $e_m(\theta)=r_m e^{-j\theta}/f-\hat{x}_m(\theta)$, with $f=h_d+\Sigma_{n=1}^{N}g_n h_n$ representing the automatic gain control (AGC) coefficient. In other words, the error signal is the difference between the input and the output of the threshold detector. The final decision on the RIS data bit is made at the end of the M-symbol interval by comparing $\Sigma_{m=1}^{M}|e_m(0)|^2$ with $\Sigma_{m=1}^{M}|e_m(\theta)|^2$. If $\Sigma_{m=1}^{M}|e_m(0)|^2 \leq \Sigma_{m=1}^{M}|e_m(\theta)|^2$, the RIS data bit is decided as 0 and the final decisions for the user symbols are ($\hat{x}_1(0), \hat{x}_2(0), \ldots, \hat{x}_M(0)$). Otherwise, the RIS data bit is decided as 1 and the final decisions for the user symbols are ($\hat{x}_1(1), \hat{x}_2(1), \ldots, \hat{x}_M(1)$).

In the embodiment with amplitude modulation, the received signal can be written as $r_m=(h_d+\Sigma_{n=1}^{N}g_n h_n)x_m+w_m$ when the auxiliary data bit is 0 and $r_m=(h_d+\rho\Sigma_{n=1}^{N}g_n h_n)x_m+w_m$ when this bit is 1. In both cases, the decision thresholds are the same when QPSK is used. This means that final decisions on the user symbols can be made without waiting for the end of the M-symbol period over which only 1 bit of auxiliary RIS data is transmitted. Let us call these decisions ($\hat{x}_1, \hat{x}_2, \ldots, \hat{x}_M$). In order to make a decision on the auxiliary data bit, two error signals must be derived at each user symbol period, one for amplitude 1 and one for amplitude $\rho$. Let us call them $e_m(1)$ and $e_m(\rho)$, respectively. They can be written as $e_m(1)=r_m/(h_d+\Sigma_{n=1}^{N} g_n h_n)-\hat{x}_m$ and $e_m(\rho)=r_m/(h_d+\rho\Sigma_{n=1}^{N} g_n h_n)-\hat{x}_m$. The decision on the auxiliary data bit is made by comparing $\Sigma_{m=1}^{M}|e_m(1)|^2$ with $\Sigma_{m=1}^{M}|e_m(\rho)|^2$. If $\Sigma_{m=1}^{M}|e_m(1)|^2 \leq \Sigma_{m=1}^{M}|e_m(\rho)|^2$ this decision is 0, and it is 1 otherwise.

In the embodiment with both phase and amplitude modulation transmitting 2 auxiliary data bits per period of M user symbols, 4 error signals must be derived at each symbol period. Specifically, for each $m \in (1, 2, \ldots, M)$, the receiver determines 2 decisions $\hat{x}_m(0)$ and $\hat{x}_m(\theta)$ respectively corresponding to phase 0 and phase $\theta$, and 4 error signals $e_m(0, 1)$, $e_m(0, \rho)$, $e_m(\theta,1)$, and $e_m(\theta, \rho)$. At the end of the M-symbol interval, the receiver computes the sums $\Sigma_{m=1}^{M}|e_m(0, 1)|^2$, $\Sigma_{m=1}^{M}|e_m(0, \rho)|^2$, $\Sigma_{m=1}^{M}|e_m(\theta, 1)|^2$, and $\Sigma_{m=1}^{M}|e_m(\theta, \rho)|^2$ and compares them. If the minimum is $\Sigma_{m=1}^{M}|e_m(0, 1)|^2$, the decisions on the user symbols are $(\hat{x}_1(0), \hat{x}_2(0), \ldots, \hat{x}_M(0))$, and the decisions on the auxiliary data bits are 00. If the minimum is $\Sigma_{m=1}^{M}|e_m(0, \rho)|^2$, the decisions on the user symbols are $(\hat{x}_1(0), \hat{x}_2(0), \ldots, \hat{x}_M(0))$, and the decisions on the auxiliary data bits are 10. Next, if the minimum is $\Sigma_{m=1}^{M}|e_m(\theta, 1)|^2$, the decisions on the user symbols are $(\hat{x}_1(1), \hat{x}2(1), \ldots, \hat{x}_M(1))$ and the decisions on the auxiliary data bits are 01. Finally, if the minimum is $\Sigma_{m=1}^{M}|e_m(\theta, \rho)|^2$, the decisions on the user symbols are $(\hat{x}_1(1), \hat{x}_2(1), \ldots, \hat{x}_M(1))$ and the decisions on the auxiliary data bits are 11.

DESCRIPTION FOR 16QAM

Figure 4:
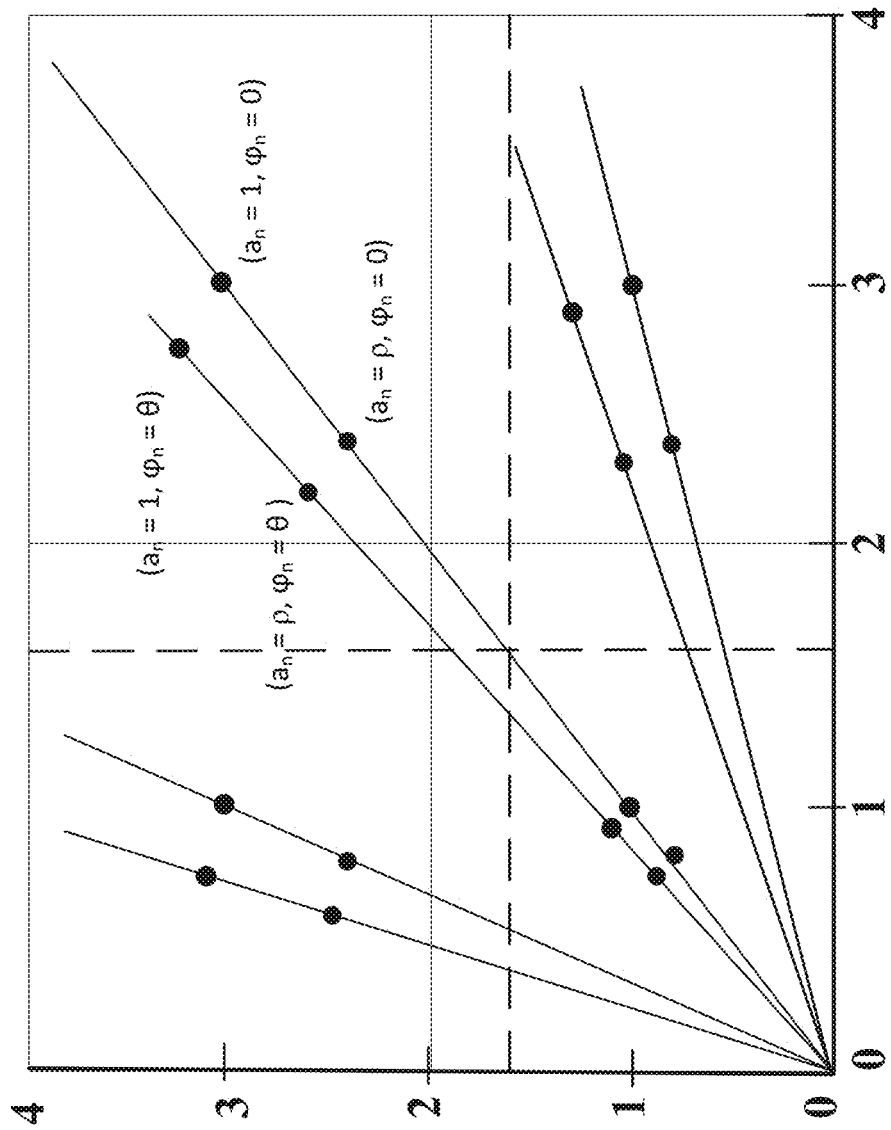
FIG. 4: Signal states in one quadrant corresponding to the transmission of 16-QAM (Quadrature Amplitude Modulation) symbols by the users and 2 bits by the RIS array through mapping onto the attenuation and phase shift parameters in accordance with the systems and methods described herein.

The situation is very similar to QPSK except that compared to the inner points $\{\pm 1, \pm 1\}$, the phase shift and attenuation will have a higher displacement of the other points of the signal constellation, and more particularly for the outer points, which are of the form $\{\pm 3, \pm 3\}$. FIG. 4 shows the signal points in the positive quadrant of the signal constellation along with the decision thresholds to make decisions on the 16QAM symbol transmitted by the user. More specifically, the horizontal and vertical thresholds which are set at a level of 2 to decide between signal levels 1 and 3 appear at a level of $2\rho$ when the signal attenuation factor is $\rho$. The corresponding thresholds are sketched using dashed lines in the figure. In contrast, no threshold changes are needed in the case of phase modulation provided that the received signal is rotated by an angle of $-\theta$ before passing it to the threshold detector. Operation of the receiver is the same as in QPSK except that with amplitude modulation too two decisions must be made for the RIS data bit at each time instant m, one being for amplitude 1 and one for amplitude $\rho$, because of the different threshold levels corresponding to the two cases. Denote by $(\hat{x}_1(1), \hat{x}2(1), \ldots, \hat{x}_M(1))$ the decisions corresponding to amplitude 1 and by $(\hat{x}_1(\rho), \hat{x}_2(\rho), \ldots, \hat{x}_M(\rho))$ the decisions corresponding to amplitude $\rho$. The respective error signals are $e_m(1)=r_m/(h_d+\Sigma_{n=1}^{N} g_n h_n)-\hat{x}_m(1)$ and $e_m(\rho)=r_m/(h_d+\rho\Sigma_{n=1}^{N} g_n h_n)-\hat{x}_m(\rho)$ for $m=1, 2, \ldots, M$. The decisions on both the user symbols and the auxiliary data bit are made at the end of the M-symbol interval by comparing $\Sigma_{m=1}^{M}|e_m(1)|^2$ with $\Sigma_{m=1}^{M}|e_m(\rho)|^2$. If $\Sigma_{m=1}^{M}|e_m(1)|^2 \leq \Sigma_{m=1}^{M}|e_m(\rho)|^2$, the decisions on the user symbols are $(\hat{x}_1(1), \hat{x}_2(1), \ldots, \hat{x}_M(1))$ and the decision on the auxiliary data bit is 0. Otherwise, the decisions on the user symbols are $(\hat{x}_1(\rho), \hat{x}_2(\rho), \ldots, \hat{x}_M(\rho))$ and the decision on the auxiliary data bit is 1.

FIG. 4: Signal states in one quadrant corresponding to the transmission of 16-QAM (Quadrature Amplitude Modulation) symbols by the users and two bits by the RIS array through mapping onto the attenuation and phase shift parameters in accordance with the systems and methods described herein.

The period of MT seconds during which an auxiliary data bit is (or a group of auxiliary data bits are) transmitted in the description above is typically a frame or a subframe of the uplink user signal. This description assumes synchronization between the user device clock and the auxiliary data clock used to dynamically configure the RIS elements. In another example embodiment, the two clocks are not perfectly synchronized, but the RIS array recognizes the beginning of each frame or subframe to change the configuration of its elements at that moment. This does not affect the operation of the receiver, which must decide the bit, or the group of bits transmitted by the RIS array during the frame or subframe. In a further example embodiment, a suboptimal receiver can be used to avoid the higher complexity of the optimum ML receiver.

An example embodiment includes an efficient method for transmitting low-speed auxiliary local data from RIS arrays by mapping the signal on the phase and/or amplitude states of the reflecting elements. Using small values of the phase and amplitude parameters involved, the inherent SNR degradation of the users' signals is made arbitrarily small. Regarding the auxiliary data transmitted by the RIS array, the minimum distance in the signal constellation plane is significantly reduced, but the corresponding performance loss is completely recovered by exploiting the low data rate property compared to the users' symbol rates. As a result, the proposed technique makes it possible to reliably transmit auxiliary data without significantly degrading the performance of the users' signals. Note that transmission of a low-speed auxiliary signal by the RS array may be an important feature in the case the array is in a factory, warehouse, or other facilities, as the data collected from different sensors or meters can be transmitted by dynamically configuring the phase and attenuation parameters of the RIS array elements.

Figure 5:
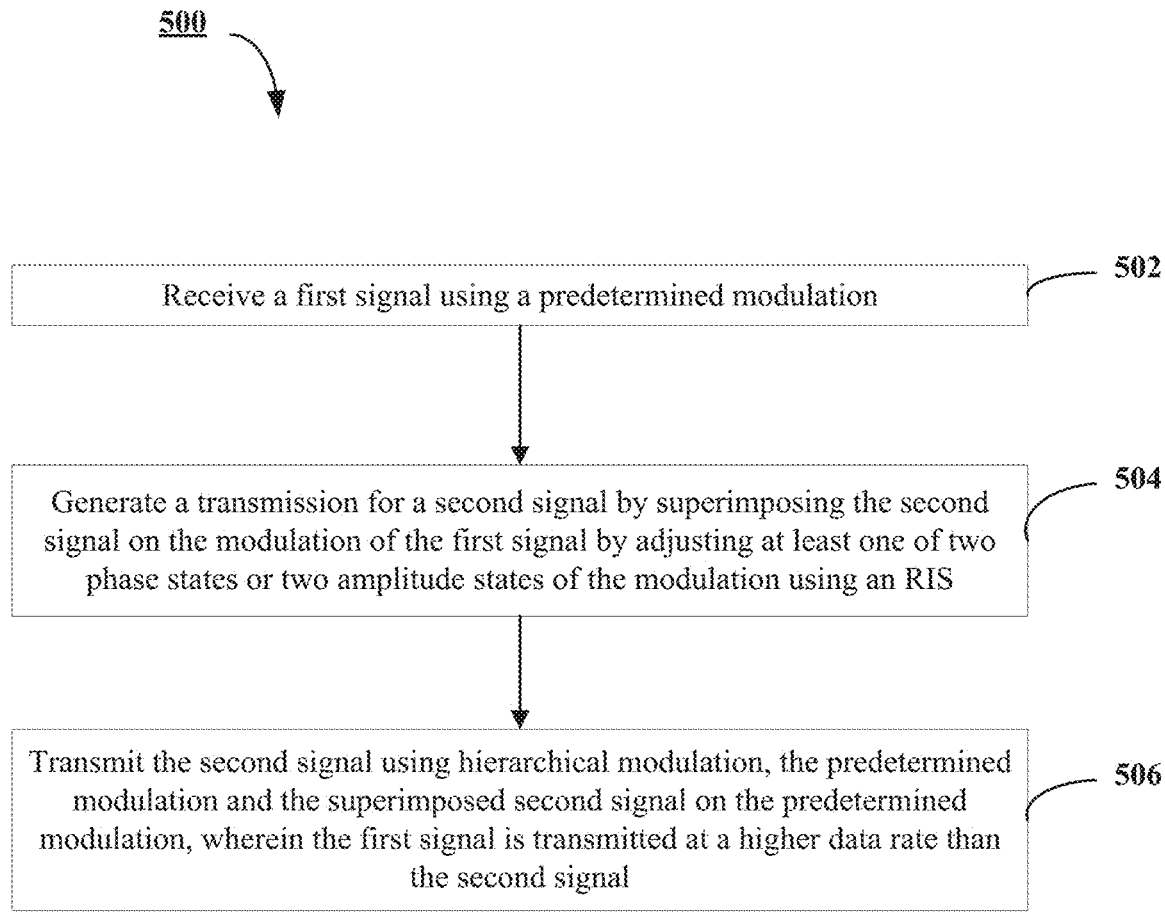
FIG. 5 is a flowchart illustrating an example method in accordance with the systems and methods described herein.

FIG. 5 is a flowchart 500 illustrating an example method in accordance with the systems and methods described herein. Some embodiments relate to systems and methods communication of electronic signals. An example method includes receiving a first signal having a predetermined modulation (502). The example method includes generating a transmission for a second signal by superimposing the second signal on the modulation of the first signal by adjusting at least one of two phase states or two amplitude states of the modulation using an RIS (504). The example method also includes transmitting the second signal using hierarchical modulation, the predetermined modulation and the superimposed second signal on the predetermined modulation, wherein the first signal is transmitted at a higher data rate than the second signal (506).

The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use may be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication of electronic signals, the method comprising:
   receiving a first signal having a predetermined modulation;
   generating a transmission for a second signal by superimposing the second signal on the modulation of the first signal by adjusting at least one of two phase states or two amplitude states of the modulation using a Reconfigurable Intelligent Surface (RIS); and
   transmitting the second signal using hierarchical modulation, the predetermined modulation and the superimposed second signal on the predetermined modulation, wherein the first signal is transmitted at a higher data rate than the second signal.

2. The method of claim 1, wherein the predetermined modulation comprises one of Quaternary phase shift keying (QPSK) modulation, 16 Quadrature Amplitude Modulation (16QAM) modulation, or any other Quadrature Amplitude Modulation scheme.

3. The method of claim 1, wherein superimposing the second signal on the modulation of the first signal is by adjusting between two phase states of the modulation.

4. The method of claim 1, wherein superimposing the second signal on the modulation of the first signal is by adjusting between two amplitude states of the modulation.

5. The method of claim 1, wherein superimposing the second signal on the modulation of the first signal is by adjusting both between two phase states of the modulation and between two amplitude states of the modulation.

6. The method of claim 5, wherein the two phase states of the modulation are used to transmit a first bit of the second signal and the two amplitude states of the modulation are used to transmit a second bit of the second signal.

7. The method of claim 1, further comprising receiving the second signal using the hierarchical modulation at a base station, the predetermined modulation and the superimposed second signal on the predetermined modulation, wherein the first signal is transmitted at the higher data rate than the second signal.

8. A communication system comprising:
   a memory; and
   a processor, coupled to the memory and including instructions that, when executed by the processor cause the processor to:
   receive a first signal having a predetermined modulation;
   generate a transmission for a second signal by superimposing the second signal on the modulation of the first signal by adjusting at least one of two phase states or two amplitude states of the modulation using a Reconfigurable Intelligent Surface (RIS); and
   transmit the second signal using hierarchical modulation, the predetermined modulation and the superimposed second signal on the predetermined modulation, wherein the first signal is transmitted at a higher data rate than the second signal.

9. The communication system of claim 8, wherein the predetermined modulation comprises one of Quaternary phase shift keying (QPSK) modulation, 16 Quadrature Amplitude Modulation (16QAM) modulation, or any other Quadrature Amplitude Modulation scheme.

10. The communication system of claim 8, wherein superimposing the second signal on the modulation of the first signal is by adjusting between two phase states of the modulation.

11. The communication system of claim 8, wherein superimposing the second signal on the modulation of the first signal is by adjusting between two amplitude states of the modulation.

12. The communication system of claim 8, wherein superimposing the second signal on the modulation of the first signal is by adjusting both between two phase states of the modulation and between two amplitude states of the modulation.

13. The communication system of claim 12, wherein the two phase states of the modulation are used to transmit a first bit of the second signal and the two amplitude states of the modulation are used to transmit a second bit of the second signal.

14. The communication system of claim 8, further comprising a base station configured to receive the second signal using the hierarchical modulation, the predetermined modulation and the superimposed second signal on the predetermined modulation, wherein the first signal is transmitted at the higher data rate than the second signal.

15. A non-transitory computer-readable medium storing computer-executable code for a communication system, comprising:
    code executable to cause the communication system to:
        receive a first signal having a predetermined modulation;
        generate a transmission for a second signal by superimposing the second signal on the modulation of the first signal by adjusting at least one of two phase states or two amplitude states of the modulation using a Reconfigurable Intelligent Surface (RIS); and
        transmit the second signal using hierarchical modulation, the predetermined modulation and the superimposed second signal on the predetermined modulation, wherein the first signal is transmitted at a higher data rate than the second signal.

16. The non-transitory computer-readable medium of claim 15, wherein the predetermined modulation comprises one of Quaternary phase shift keying (QPSK) modulation, 16 Quadrature Amplitude Modulation (16QAM) modulation, or any other Quadrature Amplitude Modulation scheme.

17. The non-transitory computer-readable medium of claim 15, wherein superimposing the second signal on the modulation of the first signal is by adjusting between two phase states of the modulation.

18. The non-transitory computer-readable medium of claim 15, wherein superimposing the second signal on the modulation of the first signal is by adjusting between two amplitude states of the modulation.

19. The non-transitory computer-readable medium of claim 15, wherein superimposing the second signal on the modulation of the first signal is by adjusting both between two phase states of the modulation and between two amplitude states of the modulation.

20. The non-transitory computer-readable medium claim 19, wherein the two phase states of the modulation are used to transmit a first bit of the second signal and the two amplitude states of the modulation are used to transmit a second bit of the second signal.

* * * * *